United States Patent
Funahashi

[11] Patent Number: 5,818,721
[45] Date of Patent: Oct. 6, 1998

[54] MARKING APPARATUS WITH IMAGE-ASSISTED CAN DEVICE THAT SYNTHESIZES MARKINGS ONTO WORKPIECE IMAGES FOR PROCESSING PROGRAMS

[75] Inventor: Kazuyuki Funahashi, Tokyo, Japan

[73] Assignee: Ando Electric Co., Ltd., Tokyo, Japan

[21] Appl. No.: 595,244

[22] Filed: Feb. 1, 1996

[30] Foreign Application Priority Data

Feb. 28, 1995 [JP] Japan ................................. 7-065014

[51] Int. Cl.[6] ........................................... G06F 19/00
[52] U.S. Cl. ............................ 364/474.24; 364/474.26; 364/474.34
[58] Field of Search ................... 364/474.24, 474.26, 364/474.34, 474.13, 470.06; 395/349; 318/568.13

[56] References Cited

U.S. PATENT DOCUMENTS

| | | | |
|---|---|---|---|
| 3,950,608 | 4/1976 | Noda et al. ............................. | 358/410 |
| 4,212,031 | 7/1980 | Schmitt et al. ......................... | 348/87 |
| 4,437,150 | 3/1984 | Dahlgren, Jr. et al. ............. | 364/474.22 |
| 4,439,834 | 3/1984 | Dahlgren, Jr. et al. ............. | 364/474.22 |
| 4,583,181 | 4/1986 | Gerber et al. ....................... | 364/470.14 |
| 4,739,487 | 4/1988 | Bonnet et al. ....................... | 364/474.08 |
| 4,742,464 | 5/1988 | Duret et al. ........................ | 364/474.25 |
| 4,758,960 | 7/1988 | Jung ................................... | 364/470.05 |
| 4,821,200 | 4/1989 | Oberg ................................. | 364/474.24 |
| 4,888,713 | 12/1989 | Falk ..................................... | 395/125 |
| 4,891,767 | 1/1990 | Rzasa et al. ......................... | 395/94 |
| 4,945,742 | 8/1990 | Schoch ................................ | 72/17.2 |
| 4,970,666 | 11/1990 | Welsh et al. ......................... | 395/123 |
| 4,972,323 | 11/1990 | Cauwet ............................... | 364/474.29 |
| 5,023,800 | 6/1991 | Carver et al. ....................... | 364/474.24 |
| 5,197,013 | 3/1993 | Dundorf ............................. | 364/474.24 |
| 5,208,763 | 5/1993 | Hong et al. ......................... | 364/551.02 |
| 5,278,953 | 1/1994 | Saxon et al. ........................ | 395/349 |
| 5,353,355 | 10/1994 | Takagi et al. ....................... | 382/111 |
| 5,360,446 | 11/1994 | Kennedy ............................. | 623/16 |
| 5,508,936 | 4/1996 | King et al. .......................... | 364/470.06 |
| 5,572,102 | 11/1996 | Goodfellow et al. .............. | 318/568.13 |

FOREIGN PATENT DOCUMENTS

| | | |
|---|---|---|
| 0 104 123 | 3/1984 | European Pat. Off. . |
| 0 398 352 | 11/1990 | European Pat. Off. . |
| 63-69700 | 3/1988 | Japan . |
| 3-27398 | 4/1991 | Japan . |
| 4-369777 | 12/1992 | Japan . |
| 2 043 300 | 10/1980 | United Kingdom . |

*Primary Examiner*—Reba I. Elmore
*Assistant Examiner*—Robert J. Dolan
*Attorney, Agent, or Firm*—Finnegan, Henderson, Farabow, Garrett & Dunner, L.L.P.

[57] ABSTRACT

A marking apparatus with a CAD device which is highly productive due to the procedure of entering an image of a workpiece 1 as a marking diagram into the CAD device 40 and constructing a work program synthesizing the marking symbols/drawings onto the marking diagram. The position of the workpiece 1 can be adjusted by monitoring the screen because an image of the workpiece 1 is displayed on the display device 4N of the CAD device 40 as a marking diagram. Additionally, marking symbols/drawings of an arbitrary scale can be synthesized in cooperation with the marking diagram of the workpiece, since the scaling ratio of the image of the workpiece 1 is displayed on the display device 4N.

3 Claims, 17 Drawing Sheets

FIG.4A

CHARACTER PARAMETERS

| Tab bar: | SYSTEMS | SETTINGS | DIAGRAM DESIGN | DIAGRAM EDIT | TEXT | PROCESSING | MACHINE CONTROL | TOOLS |

- CHARACTER SEQUENCE: MARK
- FONT: MS GOTHIC    SLANT ANGLE: [ ]
- REFERENCE POSITION: (X) [ ]  (Y) [ ]
- CHARACTER SIZE: (X) [ ]  (Y) [ ]  SPACING RATIO: [ ]
- CHARACTER ROTATION ANGLE: [ ]
- INTER-CHARACTER PITCH: [ ]
- PITCH ANGLE: [ ]
- WORK SPEED: [ ]
- ENGRAVING SURFACE: TOP    CHARACTER ORIENTATION: [ ]

[ OK ]   [ CANCEL ]

Side menu:
- CHARACTER SEQUENCE
- DESIGNATE REFERENCE LINE
- CANCEL REFERENCE LINE
- INCREMENT
- CALENDAR
- SWITCH SCREENS
- ENLARGE RANGE
- CONTRACT RANGE
- ORIGINAL SIZE
- MOVE
- COPY
- EDIT
- DELETE
- DELETE RANGE
- SAVE
- LOAD

| JOB NUMBER | PARAMETERS | | |
|---|---|---|---|
| | SUBJECT | | DATA |
| J001 | CHARACTER SEQUENCE | | MARK |
| | SIZE OF CHARACTERS | | 5.0mm |
| | MARKING SPEED | | 1.0m/min |
| | COORDINATES OF MARKING INTIATION POINT | X | 10.0 |
| | | Y | 10.0 |
| | INTER-CHARACTER PITCH | X | 5.0mm |
| | | Y | 0mm |
| | OTHER | | — |
| J002 | CHARACTER SEQUENCE | | JAPAN |
| | SIZE OF CHARACTERS | | 3.5mm |

FIG. 8
*(PRIOR ART)*

| SEQUENCE NUMBER | COMMAND SEQUENCE |
|---|---|
| S001 | H/J005/W/J002/H |
| S002 | J001/J003/W/J004 |
| ⋮ | ⋮ |

FIG. 9A
*(PRIOR ART)*

EXPLANATION OF OPERATION S001

H ------- RETURN TO ORIGIN

J005 ------ MARK J005

W ------- PAUSE (RE-START AT NEXT STEP WITH EXTERNAL INTERFACE SIGNAL

J002 ------ MARK J002

H ------- RETURN TO ORIGIN

FIG. 9B
*(PRIOR ART)*

```
> > > > >    SETTING MODE    < < < < <

J-001
CHARACTERS    A B c d 12 + /

START X          10.0    START Y                    10.0
SPACING X         0.0    SPACING Y                   5.0
CHARACTER SIZE    4.5    ENGRAVING SPEED            3000
ENGRAVING           0    SPECIAL                       C
ORIENTATION

CHARACTER SIZE - _

INSTRUCTION    1.0 ~ 20.0 mm    INPUT
MODE    CHARACTER SIZE    SETTING
TIME    94/02/14          12:34
```

FIG. 10
*(PRIOR ART)*

| FIRST MENU | SECOND MENU | FUNCTION |
|---|---|---|
| SYSTEMS | NEW | OPENS A NEW DIAGRAM |
| | LOAD | LOADS A DRAWING |
| | LOAD J FILE | LOADS A J FILE |
| | LOAD BITMAP | LOADS BITMAP DATA (BY SCANNER) |
| | LOAD WORKPIECE SHAPE | LOADS A WORKPIECE SHAPE |
| | SAVE | SAVES PREPARED DATA |
| | INPUT TOLERANCE | SETS THE INPUT TOLERANCE |
| | BROWSER | BROWSES THROUGH THE S FILES OF THE MACHINE AND CAD |
| | END | ENDS THE SYSTEM |
| SETTINGS | WORK RANGE MOVEMENT IND | DESIGNATES WORK RANGE MOVEMENT BY INDICATOR |
| | WORK RANGE MOVEMENT COORDINATES | DESIGNATES WORK RANGE MOVEMENT BY COORDINATES |
| | DISPLAY WORK RANGE FRAME | DISPLAYS WORK RANGE FRAME |
| | HIDE WORK RANGE FRAME | HIDES WORK RANGE FRAME |
| | SEND CALENDER | SENDS CALENDER CHARACTERS FROM THE CAD TO THE PROCESSING MECHANISM |
| | LOAD CALENDER | LOADS CALENDER CHARACTERS FROM THE PROCESSING MECHANISM TO THE CAD |
| | SEND DATE/TIME | SENDS THE DATE/TIME FROM THE CAD TO THE PROCESSING MECHANISM |
| DIAGRAM DESIGN | POINT | DRAWS A POINT |
| | LINE | DRAWS A LINE |
| | CURVE | DRAWS A CURVE |
| | FREE CURVE | DRAWS A FREE CURVE |
| | CENTERED CIRCLE | DRAWS A CIRCLE CENTERED AT A DESIGNATED POINT |
| | THREE-POINT CIRCLE | DRAWS A CIRCLE THROUGH THREE DESIGNATED POINTS |
| | ELLIPSE | DRAWS AN ELLIPSE |
| | BOX | DRAWS A BOX |
| | POLYGON | DRAWS A POLYGON |
| DIAGRAM EDIT | EXTEND/TRIM | EXTENDS OR TRIMS A DIAGRAM ELEMENT |
| | OFFSET | OFFSETS A DIAGRAM ELEMENT |
| | TRANSLATE | TRANSLATES A DIAGRAM ELEMENT |
| | ROTATE | ROTATES A DIAGRAM ELEMENT |
| | SYMMETRIC | SYMMETRICALLY MOVES A DIAGRAM ELEMENT |
| | ENLARGE/CONTRACT | ENLARGES OR CONTRACTS A DIAGRAM ELEMENT |
| TEXT | CHARACTER SEQUENCE | INPUTS CHARACTER SEQUENCE AND APPLIES PARAMETERS TO THE CHARACTERS |
| | DESIGNATE REFERENCE LINE | POSITIONS CHARACTERS BY DESIGNATING A REFERENCE LINE |
| | CANCEL REFERENCE LINE | CANCELS A DESIGNATED REFERENCE LINE |
| | INCREMENT | MAKES AN INCREMENTED CHARACTER SEQUENCE |
| | CALENDER | MAKES A CALENDER CHARACTER SEQUENCE |
| PROCESSING | COORDINATES | DESIGNATES THE ORIGIN OF THE COORDINATES FOR MARKING WORK |
| | DESIGNATE BORE | DESIGNATES BORE WORK RANGE |
| | CANCEL BORE | CANCELS BORE WORK RANGE |
| | SEND DATA | SENDS DATA TO PROCESSING MECHANISM |
| | WORK INSTRUCTION | INITIATES WORK ACCORDING TO THE SENT DATA |
| | SEND DATA/WORK ORDER | SENDS DATA TO THE PROCESSING MECHANISM AND AWAITS WORK INSTRUCTIONS |

FIG. 13
(PRIOR ART)

| | | |
|---|---|---|
| MACHINE CONTROL | MOVE PEN | MOVES THE POSITION OF THE PEN AT THE PROCESSING MECHANISM TO A POSITION INDICATED BY THE MOUSE |
| | RETURN TO ORIGIN | RETURNS THE POSITION OF THE PEN AT THE PROCESSING MECHANISM TO THE ORIGIN |
| | PEN ON/OFF | SWITCHES THE PEN AT THE PROCESSING MECHANISM ON/OFF |
| | PEN UP/DOWN | SWITCHES THE PEN AT THE PROCESSING MECHANISM UP/DOWN |
| TOOLS | HARD COPY | MAKES A HARD COPY OF THE SCREEN |
| | PAINTBRUSH | READS A BITMAP FILE FROM A HARD COPY AND OUTPUTS TO THE PRINTER |
| PUSH-DOWN MENU | SWITCH SCREENS | SWITCHES BETWEEN WORKPIECE SHAPE AND WORK RANGE |
| | ENLARGE RANGE | ENLARGES THE DESIGNATED RANGE DISPLAY |
| | CONTRACT RANGE | CONTRACTS THE DESIGNATED RANGE DISPLAY |
| | ORIGINAL SIZE | DISPLAYS THE ENTIRE WORK RANGE |
| | MOVE | MOVES THE DISPLAY POSITION |
| | COPY | COPIES THE DISPLAYED ELEMENT |
| | EDIT | EDITS THE DISPLAYED ELEMENT |
| | DELETE | DELETES AN ELEMENT |
| | DELETE RANGE | DELETES ELEMENTS WITHIN A DESIGNATED RANGE |
| | SAVE | SAVES A TEMPORARY FILE |
| | LOAD | LOADS A TEMPORARY FILE |

*FIG. 14*
*(PRIOR ART)*

MARKING APPARATUS WITH IMAGE-ASSISTED CAN DEVICE THAT SYNTHESIZES MARKINGS ONTO WORKPIECE IMAGES FOR PROCESSING PROGRAMS

BACKGROUND OF THE INVENTION

1. Field of the Invention

The present invention relates to marking apparatus with CAD devices. In particular, it relates to marking apparatus with CAD devices which pick up images of workpieces and synthetically plot marking symbols/drawings on marking diagrams of such workpieces displayed on CAD devices in order to construct processing programs.

2. Description of the Related Art

The structure of a conventional marking apparatus is illustrated in FIG. 5, wherein reference numeral 10 denotes a mechanical section, reference numeral 11 denotes an air supply unit and reference numeral 20 denotes a stand. Additionally, reference numeral 30 denotes a control section, reference numeral 40 denotes a CAD (computer-aided design, hereinbelow abbreviated as CAD) device and reference numeral 50 denotes a printer which functions as an output device.

The air supply unit 11 supplies clean air, at an appropriate pressure and flow level, from an air source to the mechanical section 10. The mechanical section 10 is installed on the stand 20, and has an engraving means to be explained below. The control section 30 is connected to the mechanical section 10 and controls the mechanical operations of the mechanical section 10. The control section 30 is also connected to the printer 50, which prints images on paper upon receiving instructions. The CAD device 40 is connected to the control section 30, and controls the mechanical section 10 by instruction via the control section 30. Flexible disks FD, which function as recording media, are inserted into the CAD device 40. Data and programs are written onto or read from the FDs.

The structure of the mechanical section 10 is illustrated in FIG. 6. Reference symbol CYL1 denotes an air pen having a stylus 1A. When compressed air is supplied to the air pen CYL1, the stylus 1A rapidly oscillates (vibrates). If the conical tip of the stylus 1A is pressed onto a workpiece 1 while rapidly vibrating, a bowl-shaped depression is formed on the surface of the workpiece 1. If the stylus 1A is then moved, a continuous line is formed. Furthermore, arbitrary symbols can be marked by numerically controlling the motion of the stylus 1A to trace out marking symbols.

The structure of air pens (engraving means) with rapidly vibrating styluses 1A at their tips as shown in FIG. 6 is known from FIGS. 2 through 4 of Japanese Patent Application No. 61-214530 (JPA, First Publication No. 63-69700).

That is, when compressed air is supplied through the head portion of the air pen CYL1, a piston inside the air pen CYL1 which is the extended axis of the stylus 1A is pushed upward. When the piston is pushed up to a standard position, the compressed air enters through a connecting hole formed in the stylus 1A and presses the piston downward. After the piston has been pressed down to a standard position, the compressed air comes through the connecting hole and is released through an ejection hole in the air pen, whereupon the piston is again forced upward. The stylus 1A is rapidly vibrated by repeating these actions.

As shown in FIG. 6, the air pen CYL1 is attached to a bracket BL1. The other end of the bracket BL1 is coupled to a piston cylinder of a cylinder CYL2. The cylinder CYL2 is a single-rod double-action air cylinder which balances the air pen CYL1 on the z-axis. Z-axis balancing mechanisms for engraving machines of this type are known, for example, from Japanese Patent Application, Second Publication No. 3-27398.

Compressed air is supplied through a bottom port of the cylinder CYL2 to apply pressure for balancing out the dead weight of the air pen CYL1 and bracket BL1. Compressed air of a pressure suitable for the stylus 1A to engrave the workpiece 1 is supplied through a top port of the cylinder CYL2. By balancing the motion along the z-axis of the air pen CYL1 with the cylinder CYL2, workpieces can be engraved without sacrificing engraving quality even if they have curved or inclined surfaces.

In the example shown in FIG. 6, the vibration stroke of the stylus 1A is approximately 1.5~2.5 mm. The workpiece 1 is able to be engraved so that the work surface has an elevation difference of up to 15 mm due to the mechanical section 10 which has a z-axis balancing mechanism.

The xy-movement mechanism of the air pen will be explained with reference to FIG. 6. The head end of the cylinder CYL2 is attached to the bracket BL2. A ball nut is held at one end of the bracket BL2, and the ball nut is coupled to a ball screw BS1. A pulley PL2 is affixed to one end of the ball screw BS1. A pulley PL1 is affixed to the end of a rotational axis of a motor MX. A timing belt TV1 which conducts the rotation of the motor MX to the ball nut BS1 is wound about the pulleys PL1 and PL2.

When the motor MX rotates, the bracket BL2, the cylinder CYL2, the bracket BL1 and the air pen CYL1 move unitarily along the x-axis.

The x-axis movement mechanism is attached to a bracket BL3. A ball nut, coupled to a ball screw BS2, is held on the bracket BL3. A pulley PL4 is affixed to one end of the ball screw BS2, and a pulley PL3 is affixed to an end of the rotational axis of the motor MY. A timing belt TV2 is wound about pulley PL3 and PL4 to conduct the rotation of the motor MY to the ball screw BS2.

When the motor My rotates, the x-axis movement mechanism moves unitarily along the y-axis.

The motors MX and MY are pulse motors which are connected to the mechanical operation control means (driver circuit) of the control section 30, and move the air pen CYL1 in the x-y directions of a plane according to instructions from the control section 30. In the example shown in FIG. 6, the stylus 1A is able to move with a resolution of 0.1 mm and the marking range (x×y) of the air pen CYL1 is 100 mm×100 mm.

The air pen CYL1 and the cylinder CYL2 are respectively connected to electromagnetic valves, which are switched upon instructions from the control section 30.

The mechanical section 10 is installed on a pole 21 of a stand 20. The workpiece 1 is placed on a table 22 and anchored. The table 22 is raised and lowered by rotating a handle 23. While the workpiece in FIG. 6 is raised and lowered manually, an automated elevation table can be used when applying to a production system.

The operations of the example of FIG. 5 will be explained with reference to the functional block diagram of FIG. 7. The control section 30 comprises a CPU 3A, a setting means 3B, an input/output control means 3D, a marking means 3E, an automation means 3F and a mechanical operation control means 3L.

The control section 30 has a ROM 3G storing symbol data, a job number (hereinafter abbreviated to J-number) memory 3J, and a sequence number (hereinafter abbreviated to S-number) memory 3S. A group of keys and switches positioned on the control panel of the control section 30, which form input means 3M, are connected to a CPU 3A, and the CPU 3A is connected to a display section 3N located on the control panel. The composing elements of the control section 30 operate according to instructions from the CPU 3A.

At the control section 30, markings are set by units of J-number. The J-number is a positioning number for positioning the parameters required for marking in memory. The parameters are pre-set values necessary for marking, such as character sequences, character size, marking rate, marking initiation coordinates, and intercharacter pitch. It is possible to preset up to 512 J-numbers, which form the parameter groups, within the J-number memory 3J. The relationship between the J-numbers and the parameters required for marking are shown in FIG. 8.

The J-numbers are integrated into the sequence numbers as command sequences. With this marking apparatus, S-numbers are assigned to groups of marking actions which form work procedures combining actions such as return of the air pen to the origin, pausing of marking and movement to the work initiation point. The S-numbers are able to be set at the S-number memory 3S. FIG. 9A shows an example of the relationship between the S-number and command sequences. FIG. 9B shows an example of a command operation.

That is, in this marking apparatus, work programs are stored in the S-number memory 3S in units of S-number. Consequently, when a pre-set work program is re-used, the S-number in the S-number memory 3S is displayed at the display section 3N by the input means 3M. Next, the S-number is assigned, and when the work program is instructed to start, the CPU 3A proceeds with the work program by the mechanical operation control means 3L and the mechanical operation control means 3L controls the action of the mechanical section 10.

FIG. 10 shows an example of the screen of the display section 3N of the control section 30. At the control section 30, setting means 3B, inching means 3C, marking means 3E and automation means 3F respectively switch between screens by selecting the mode keys of input means 3M corresponding to the setting mode, inching mode, marking mode and automation mode. FIG. 10 shows an example of a screen in the setting mode.

In the setting mode, parameters such as the J-number, the S-number, and the marking symbols required for marking are set. In the inching mode, the J-number, jog rate, jog interval, air pen operation, and pen pressure are set by corresponding keys on the input means 3M. By operating the initiation key, the air pen can be inched.

In the marking mode, marking can be activated by setting a J-number or S-number from the display screen of the marking mode on the display section 3N. The marking mode is also provided with a monitoring function. That is, the symbols currently being marked in the markings can be displayed one-by-one on the screen if the monitoring function is selected in the display screen for the marking mode on the display section 3N. Additionally, if the printer key is set, then the marked symbols are outputted from the printer 50 upon termination of the marking function.

In the automation mode, the markings can be performed by external control. Also in the automation mode, the received commands, the J-number and S-number of the markings, and the S-number sequence being performed are displayed. Data and instructions are sent and received from external devices through the input/output control means 3D.

Next, the method for setting the marking symbols in the setting mode of FIG. 10 will be explained with reference to FIGS. 11A–11D. In the setting mode, the marking data formed from characters, numbers and symbols are set and stored in the ROM 3G. Then, the selected symbols are contracted or enlarged. As shown in FIG. 11A, the symbol is set by contracting symbol data drawn within a square frame 100 mm on a side. That is, the size of the symbol is set by assigning the length "n" of each side of the square frame. In this example, the symbol can be marked with a maximum size of 20 mm and a minimum size of 1 mm.

After the size of the symbols has been set, the interval pitch is set. The marking initiation point is the center of the square frame shown in FIG. 11A. Once the x and y coordinates of the first symbol have been set, the interval pitch in the x and y directions is set as illustrated in FIG. 11B. The pitch Px in the x direction and the pitch Py in the y direction are able to be set separately. The orientation of the symbols (marking orientation) also needs to be set.

With this apparatus, four types of character orientations can be selected and set according to corresponding numerical values (0~3) as shown in FIG. 11C. Furthermore, when the symbols are to be arranged along an arc as shown in FIG. 11D, an arc marking function is read and set from the setting mode as an optional function. As another optional function, the date and time can be marked onto the workpiece based on a timer inside the control section 30. The details of other optional functions will be omitted.

Turning once again to FIG. 5, the structure of the marking apparatus is such that the mechanical section 10 and the control section 30 are the minimum required composing elements, and marking is able to be performed by the mechanical section 10 and the control section 30. For example, the air supply unit 11 can either be a composing element of the mechanical section 10, or may be prepared by the user. Additionally, the frame 20 can be replaced by an automatic transport apparatus for the workpieces in an application to a production system. Furthermore, if there is no need to monitor the marking operation, the printer 50 also becomes unnecessary.

However, when marking patterns, the training and labor of operators are required in order to set symbols or numerical values for the markings. Therefore, the assistance of a CAD device is necessary in order to easily mark diverse patterns or symbols.

Next, the structure and operation of the CAD device 40 will be explained with reference once again to FIG. 7. The main body of the CAD device 40 contains a CPU 4A. The CPU 4A is connected to a systems file 4B, a setting file 4C, a diagram design file 4D, a diagram edit file 4E, a text file 4F, and a work file 4G.

Additionally, the CPU 4A is connected to a function means comprising an input/output control means 4H, a screen switching means 4J, a tool means 4K, and a machine control means 4L. The lower tier selected by means of screen switching means 4J contains a range enlargement means J1, a range contraction means J2, a work range display means J3, a movement means J4, a copying means J5, an editing means J6, a deletion means J7, a range deletion means J8, a save means J9A, and a load means J9B.

Furthermore, an FD drive device 4M which drives an FD upon instruction by a CPU 4A to read from and write onto the FD is provided internally or externally on the main body of the CAD device 40. The CAD device 4A also displays data sent from the CPU 4A, and has a CRT which functions as a display device 4N, a mouse 4P as a first input means which selects from menus or indicates by moving a cursor over the display device 4N, and a keyboard as a second input means. The keyboard 4Q inputs numerical values and characters/symbols.

Next, the method of operation of the CAD device 40 will be explained with reference to the screens displayed on the display device 4N. FIG. 12 shows the initial screen displayed on the display device 4N. This CAD device is an interactive diagram editing device, wherein the mouse 4P is used to select from menus displayed on the screen. Additionally, when picking (selecting elements) or indicating (indicating a position on an onscreen element), or when drawing diagrams by diagram design, an onscreen cursor is moved with the mouse 4P and selection or termination is indicated by clicking a button on the mouse 4P.

A file menu containing files from the systems file 4B to the work file 4G is displayed in the top row of the screen in FIG. 12. This menu will be referred to as the first menu. That is, this CAD device has a two-tiered file structure wherein a lower-tiered file menu is displayed when the mouse 4P is used to choose a file from the first menu. The lower-tiered menu will be referred to as the second menu.

A second menu is displayed in the upper portion of the left column on the screen in FIG. 12. On the screen, the files belonging to the systems file 4B are displayed. When a given file is selected from the second menu by means of the mouse 4P, a function corresponding to the function display is performed. FIG. 13 shows the second menus corresponding to the files in the first menu, as well as the functions in the second menus.

A pushdown (hereinafter abbreviated to PD) menu selected by the screen switching means 4J is continually displayed at the bottom portion of the left column of the screen of FIG. 12. By selecting the screen switching means 4J of FIG. 12, the screen is switched between the profile of the workpiece and the work range. The functions of the PD menu are shown in FIG. 14. The "original size" function displayed in FIG. 12 corresponds to the work range display means J3 of FIG. 7.

Instructions which can be selected by means of the click button on the mouse 4P are displayed on the lefthand side of the bottom row in FIG. 12. When the running of the menus is to be terminated, the cursor is moved to the "END" display the button on the mouse 4P is clicked. "DEFINE" and "RE-START" are operated similarly.

A message area for displaying messages according to the selected menu is provided at the center of the bottom row of FIG. 12. Picking and indicating are performed depending upon the displayed message.

A note area which displays the coordinate values corresponding to the position of the cursor is provided on the righthand side of the bottom row of FIG. 12. The note area displays the coordinate values of the cursor as "X=a mm, Y=b mm". In this case, "a" and "b" are variables which change depending on the movement of the mouse 4P, and their numerical values correspond to the distances from the origin on the table holding the workpiece.

With the CAD device of FIG. 7, the profile of the workpiece 1 is first designed onscreen, then the marking symbols/drawings are designed, after which the marking symbols/drawings are synthesized onto the workpiece profile. As a result, an operator can confirm the relationship between the workpiece profile and the marking symbols/drawings onscreen, and the CAD device 40 can automatically convert the synthesized design into a work program.

That is, the work program 41 in FIG. 7 is sent to the control section 30 via the input/output means 4H, where the work program 31 is converted to a work program 31 of the control section 30, which instructs and controls the mechanical section 10. In this case, the control section 30 should be in the automatic mode by selection of the automation means 3F. Additionally, signals are sent and received between the CAD device 40 and the control section 30 by an RS-232 interface.

The files designed on the CAD device 40 can be stored in an FD. When saving a workpiece profile, a first file with programs of different S-numbers as explained with reference to FIG. 5, a second file preserving workpiece profile data, and a third file with drawing data are separately saved by changing the extension element. When a marking diagram is to be saved, a fourth file with drawing and workpiece profile data is stored in addition to the above-mentioned first through third files by changing the extension element. When markings are to be made, one of the files is read out and the diagram is edited or the same program is run.

In the CAD device, files "MACHINE CONTROL" and "TOOL" appear in the first menu as indicated in the function table of FIG. 14, and underneath each of these files, the corresponding functions shown in FIG. 14 appear. The function of the machine control means 41 of FIG. 7 corresponds to the inching means 3C of the control section 30, and the function of the tool means 4K corresponds to the engraving means 3E of the control section 30. That is, with this apparatus, the CAD device may be considered to be remotely controlling the mechanical section 10.

FIGS. 15A and 15B show an example of an engraving by the apparatus of FIG. 7. In FIG. 15A, reference numeral 1 denotes a workpiece placed on the table 22 held by the stand 20. In FIG. 15B, reference numeral 1W denotes a word engraved on the workpiece 1. Reference numeral 1DF of FIG. 15B shows a workpiece profile of the workpiece 1 shown in FIG. 15A, which is displayed on the display device 4N of FIG. 7.

As shown in FIG. 15, even if a work program is constructed by a diagram synthesized from the workpiece profile and the marking symbols/drawings on a display screen, the marking symbols/drawings are not necessarily engraved at the correct positions on the workpiece 1. In FIG. 15A, the orientation of the word 1W is not parallel with the side of the workpiece 1.

Therefore, a test run is performed when marking a product. According to the example of FIG. 15A, the attachment position of the workpiece 1 on the table 22 is adjusted after performing the test run. Then, another test run is performed to confirm that the orientation of the word 1W and the sides of the workpiece are parallel before marking the product.

It is useful to apply a jig to the table 22 to place the workpieces 1 at a standard position, so that only operation of the CAD device 40 is necessary when marking production numbers on mass-produced workpieces 1. The CAD device 40 of FIG. 7 is highly productive due to the "NUMBER INCREMENT" function which increments a number by one each time a marking is made.

However, the apparatus of FIG. 7 cannot effectively handle the marking of workpieces 1 for which small amounts of various types are produced simply through repetition of test runs. Efficiency and productivity are also lost.

SUMMARY OF THE INVENTION

The object of the present invention is to offer a marking apparatus with a CAD device which is highly productive due to the procedure of entering an image of a workpiece as a marking diagram into the CAD device by an imaging means, displaying the marking diagram on the CAD device, displaying the marking diagram such that the scaling ratio on the workpiece diagram is perceptible on the CAD device, and a work program is constructed by synthesizing the marking symbols/drawings onto the marking diagram.

In order to achieve this object, the marking apparatus with a CAD device according to the present invention comprises a marking apparatus with a CAD device, comprising imaging means for taking images of workpieces; program construction means for displaying images of workpieces taken by said imaging means, along with marking symbols and drawings to be engraved onto said workpieces, onto display means, then constructing work programs based on the displayed results; engraving means for engraving said marking symbols and drawings onto said workpieces; and control means for moving said engraving means in X and Y directions based on said work programs.

With the above-described composition, the position of the workpiece 1 can be adjusted by monitoring the screen because an image of the workpiece 1 is displayed on the display device 4N of the CAD device 40 as a marking diagram. Additionally, marking symbols/drawings of an arbitrary scale can be synthesized in cooperation with the marking diagram of the workpiece, since the scaling ratio of the image of the workpiece 1 is displayed on the display device 4N.

BRIEF DESCRIPTION OF THE DRAWINGS

FIGS. 4A and 4B are display screens of the display device 4N.

FIG. 8 is a table showing the relationship between the J-numbers and the parameters required for marking.

FIG. 9A is a table showing the relationship between the S-numbers and the command sequences.

FIG. 9B is a chart explaining the command operations.

FIG. 10 is a diagram showing an example of a screen from the display section 3N of the control section 30.

FIG. 13 is a first diagram explaining the functions of the menus on the CAD device 40.

FIG. 14 is a second diagram explaining the functions of the menus on the CAD device 40.

PREFERRED EMBODIMENTS OF THE INVENTION

Figure 1:
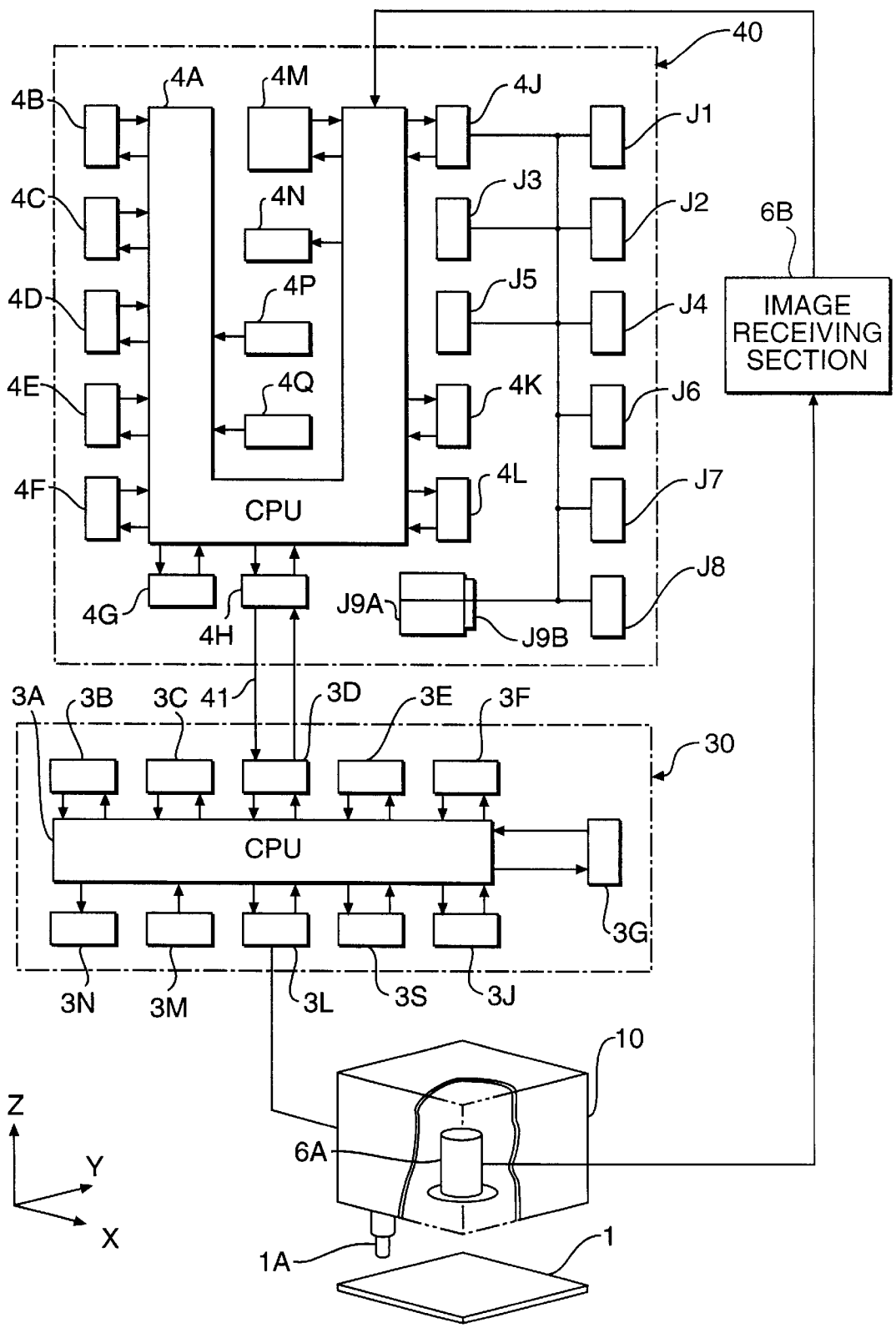
FIG. 1 is a structural diagram illustrating an embodiment of a marking apparatus with a CAD device according to the present invention.
Figure 7:
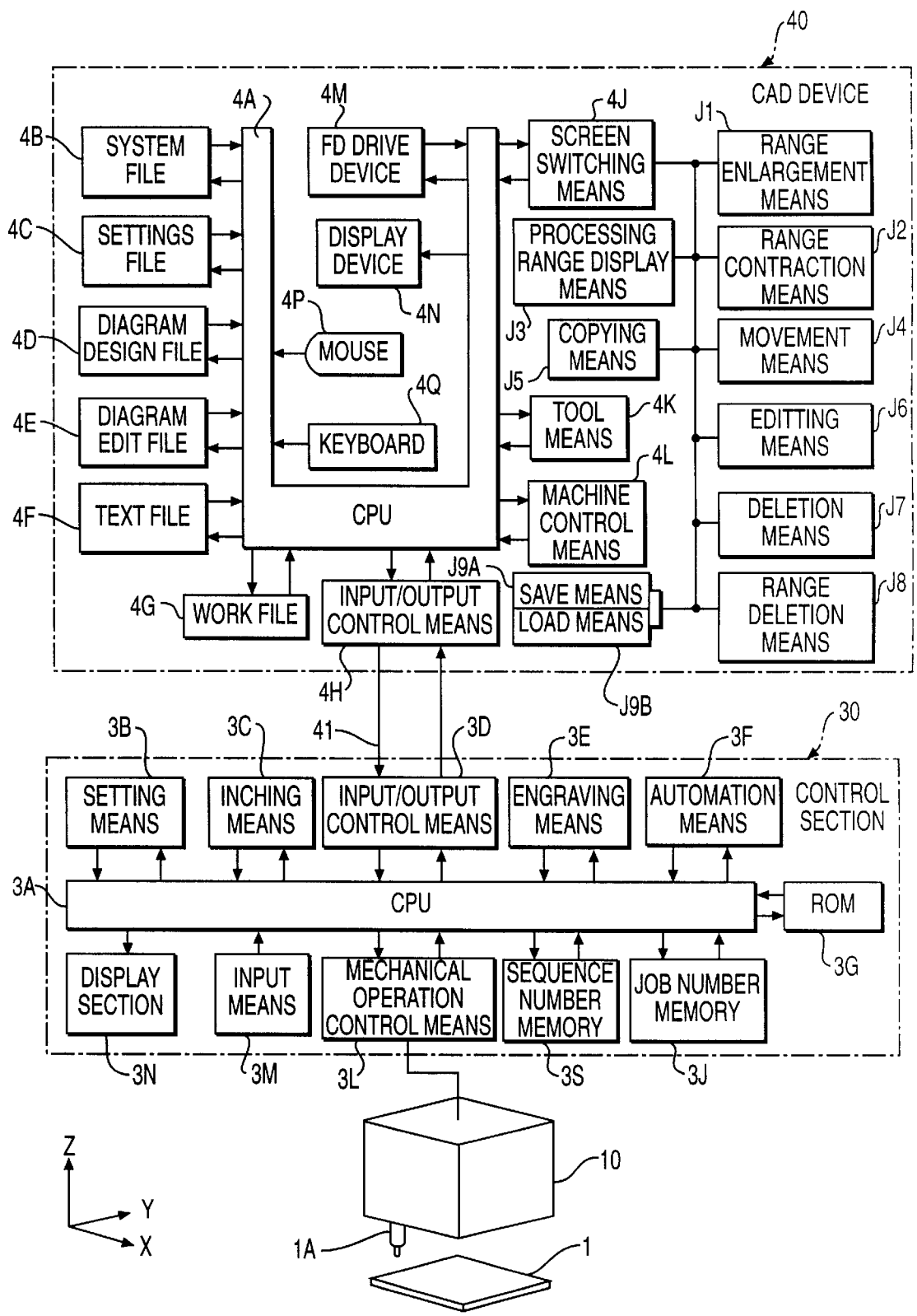
FIG. 7 is a function block diagram explaining the operations of the apparatus of FIG. 5.
Figure 11A:
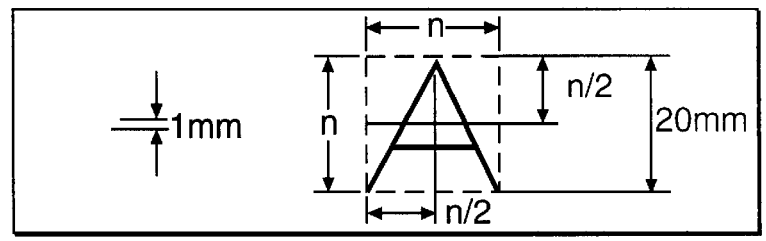
FIGS. 11A, 11B, 11C and 11D are diagrams showing methods for setting marking symbols.
Figure 11B:
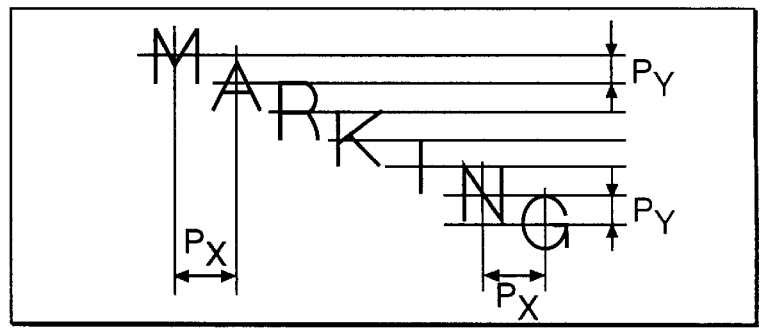
Figure 11C:
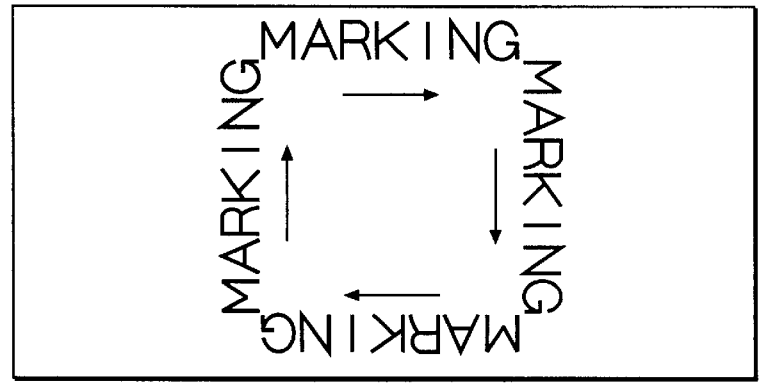
Figure 11D:
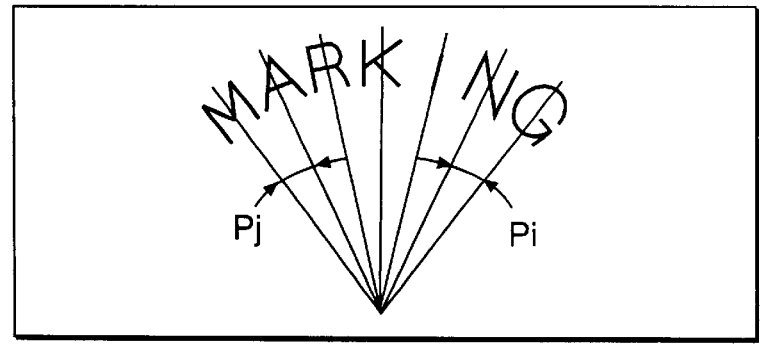

Next, the structure of the marking apparatus with a CAD device according to the present invention will be explained with reference to the embodiment shown in FIG. 1. Reference numeral 6A denotes a video camera, reference numeral 6B denotes an image receiving section, and the remaining structure is identical to that shown in FIG. 7. The video camera 6A and the image receiving section 6B combine to form form an image reading apparatus. Therefore, the apparatus of FIG. 1 has the structure shown in FIG. 7, with the addition of an image reading apparatus.

The video camera 6A which is an imaging means is positioned at the mechanical section 10. The video camera 6A films the workpiece 1 in a manner such that the focal point is aligned at the surface of the workpiece 1. The image data filmed by the video camera 6A is sent to the image receiving section 6B.

The image receiving section 6B converts analog data from a scan sent by the video camera 6A into digital data, and sends it to the CAD device 40. More specifically, the data are read from the image receiving section 6B as a bitmap file by a file reading function of the systems file 4B of the CAD device 40; the details are given below.

The bitmap file read by the image receiving section 6B is displayed on the display device 4N as a marking diagram.

Next, the operational procedures of an apparatus according to the present invention will be explained with reference to the flow chart of FIG. 2. The switching screens of the display device 4N shown in FIGS. 3A–3B and 4A–4B will be referred to when suitable for simplifying the explanation of the flow chart of FIG. 2.

Figure 2:
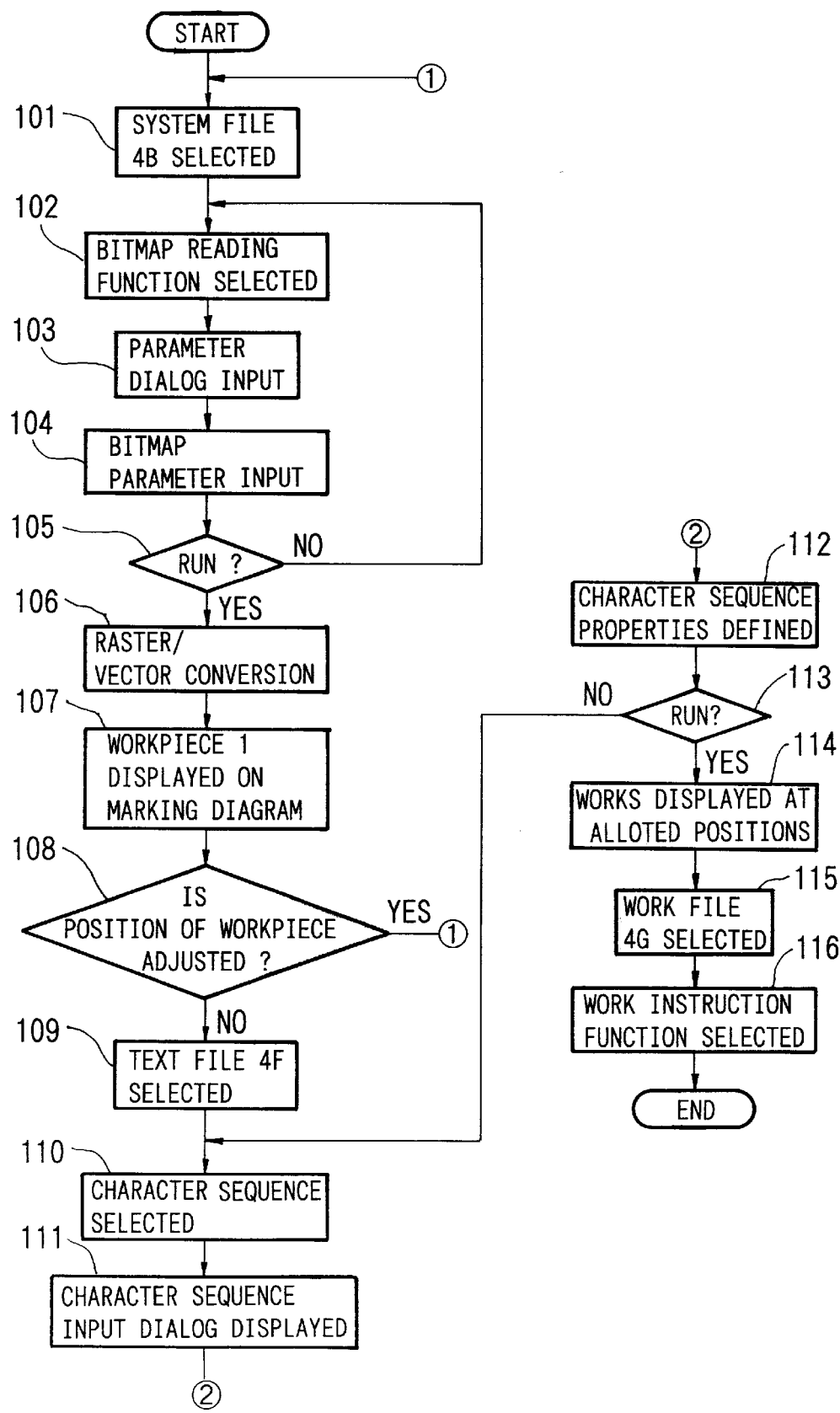
FIG. 2 is a flow chart showing an operational procedure for an apparatus according to the present invention.
Figure 12:
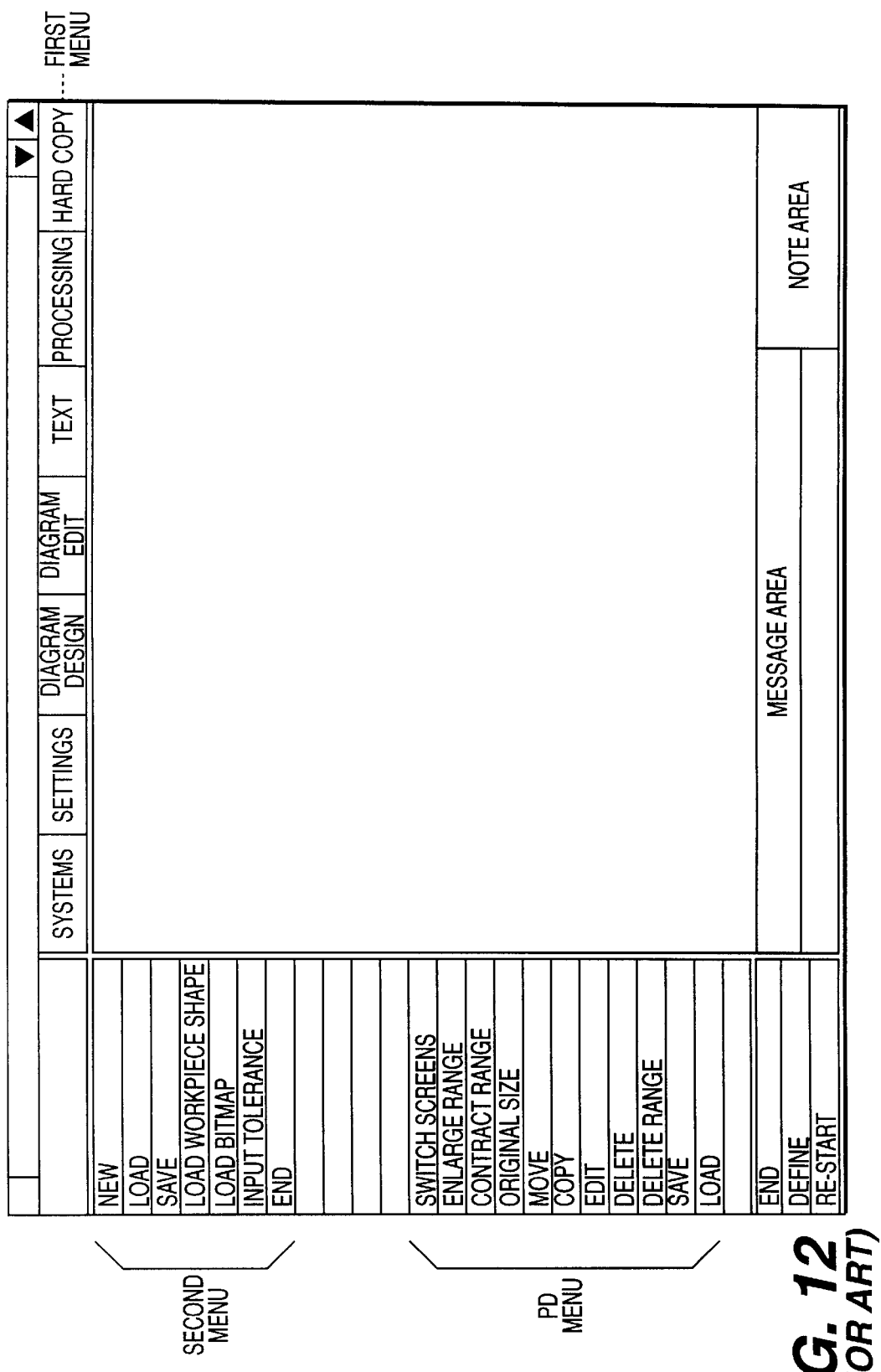
FIG. 12 is a diagram showing the initial screen displayed on the display device 4N.
Figure 15A:
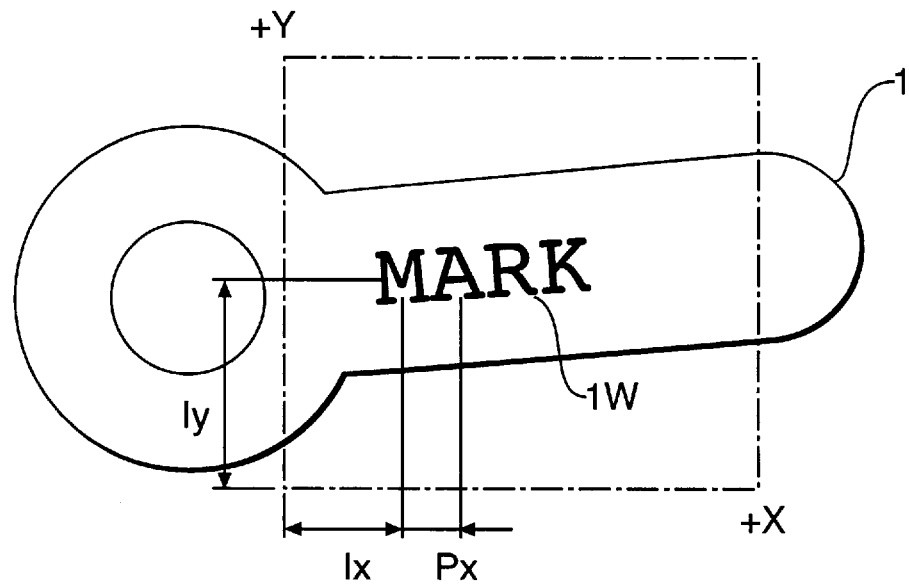
FIGS. 15A and 15B are diagrams illustrating examples of engravings according to the apparatus of FIG. 7.
Figure 15B:
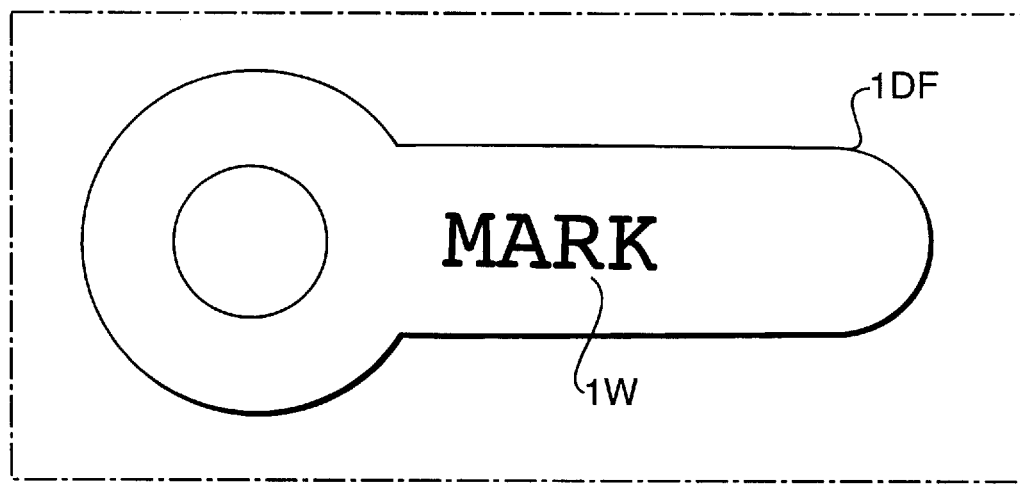

In step 101 of FIG. 2, the systems file 4B is selected from the first menu shown in FIG. 12 by means of the mouse 4P. In step 102, the bitmap reading function is selected from the second menu. In step 103, the parameter dialog of the bitmap reading is displayed on the screen of the display device 4N.

Figure 3A:
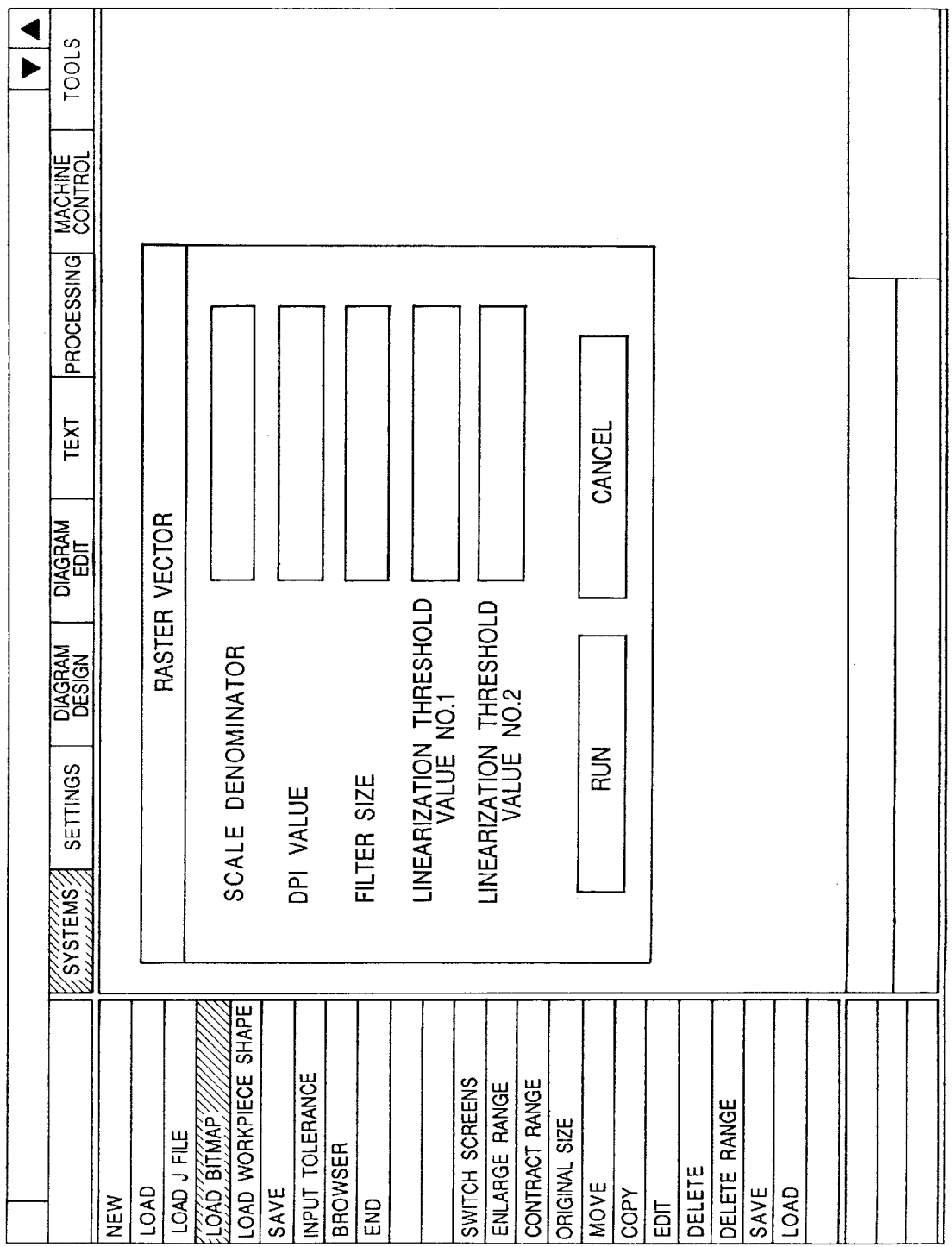
FIGS. 3A and 3B are display screens of the display device 4N.

FIG. 3A shows the display screen for the parameter dialog of step 103. At step 104, the bitmap parameters are input for the parameter dialog.

Here, the parameters for bitmapping will be explained. The parameters include "SCALE DENOMINATOR", "DPI VALUE", "FILTER SIZE", "LINEARIZATION THRESHOLD VALUE NO. 1" and "LINEARIZATION THRESHOLD VALUE NO. 2".

The "SCALE DENOMINATOR" is the ratio by which the original size is reduced, and indicates the value of the denominator when the numerator is 1. If the scaling parameter is set to "1/1", then the workpiece will be displayed onscreen in its actual size. The "DPI" value refers to the "dots per inch", and indicates the number of dots in one inch. The "FILTER SIZE" is the value which sets the standard for the removal of irrelevant data.

With reference once again to FIG. 2, when the parameters are input by the keyboard 4Q, it is confirmed whether to run the parameters at step 105. At step 105, the procedure advances to step 106 if the parameters are accepted, and returns to step 102 if the parameters are cancelled.

Figure 3B:
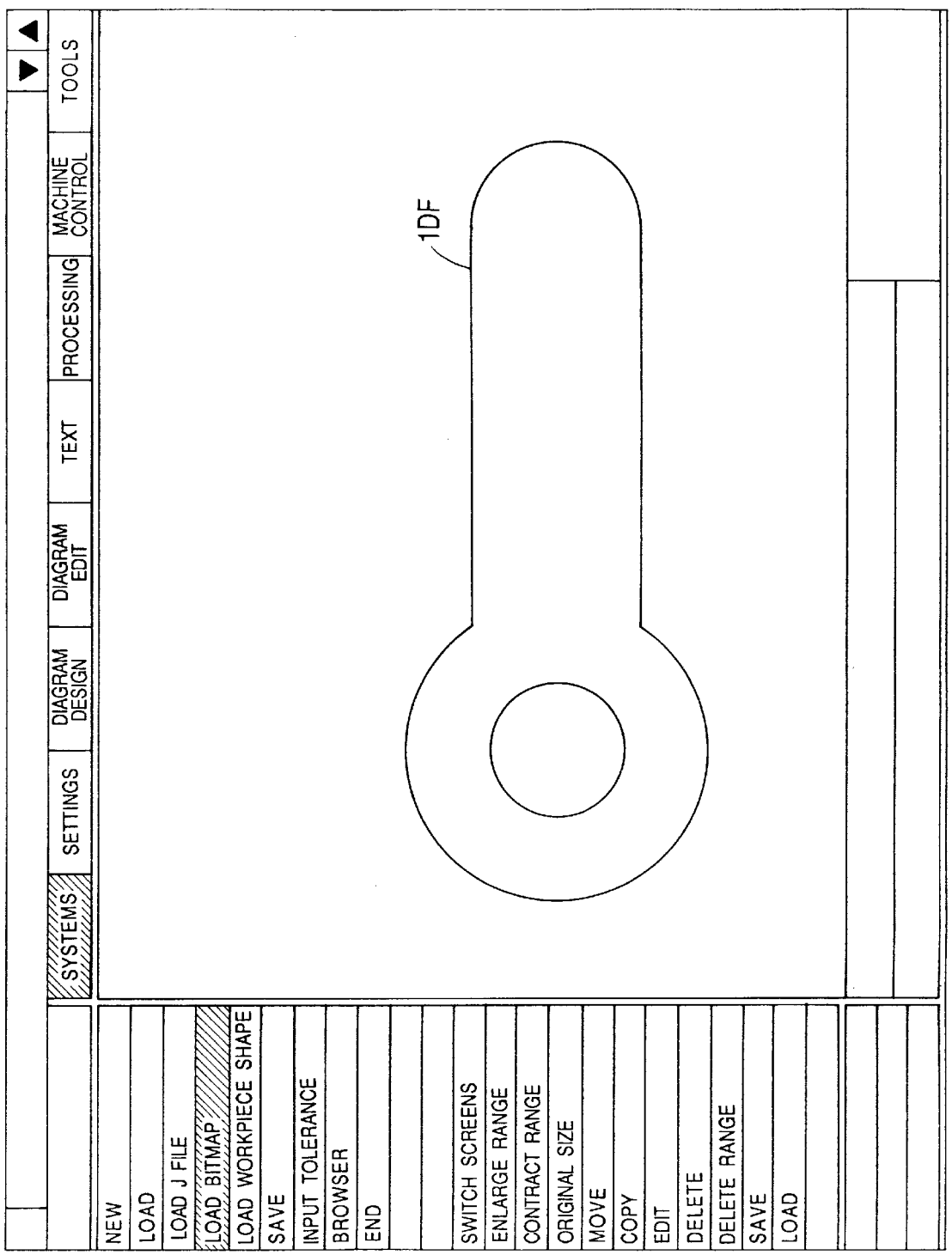
Figure 4B:
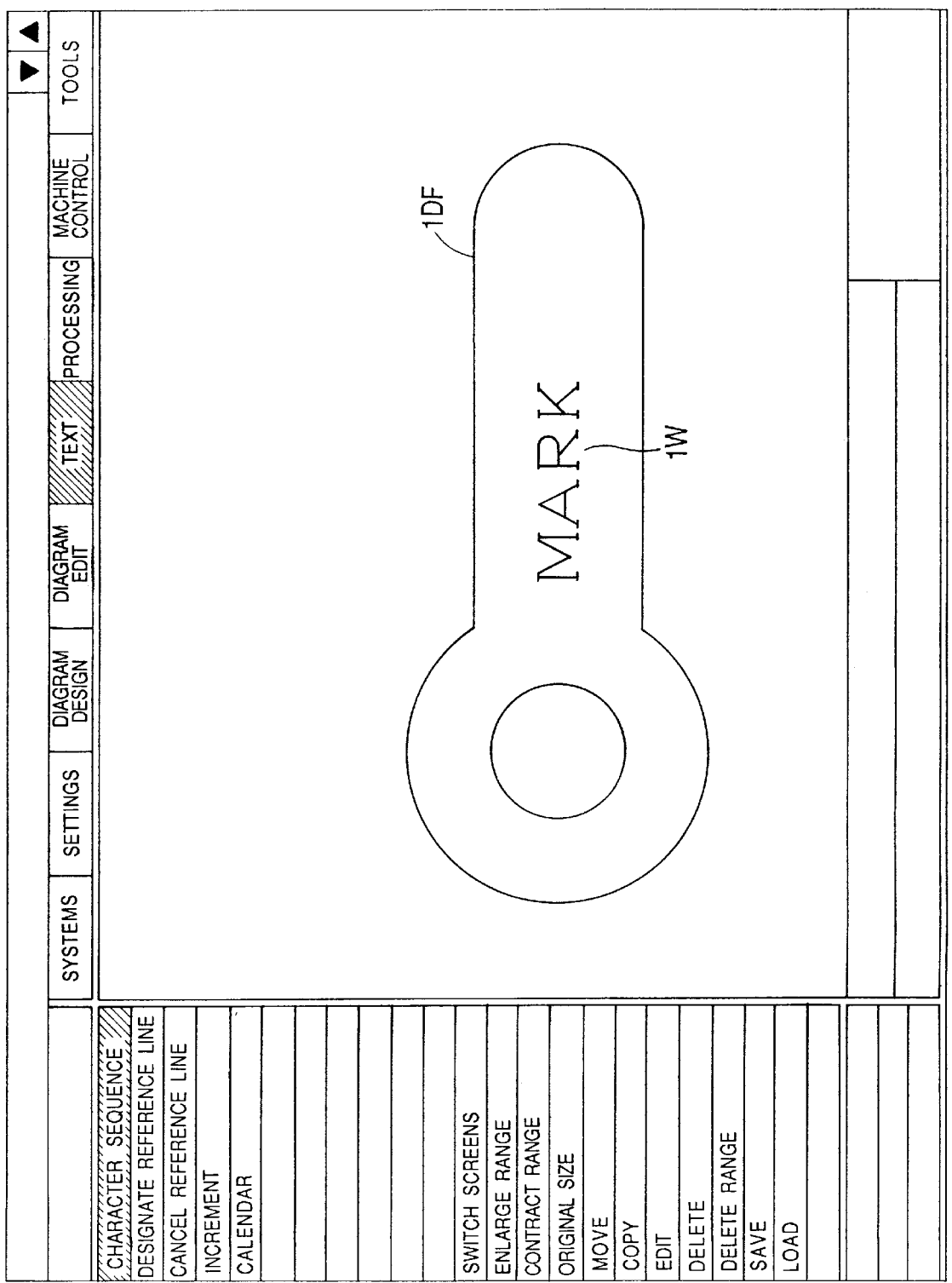
Figure 5:
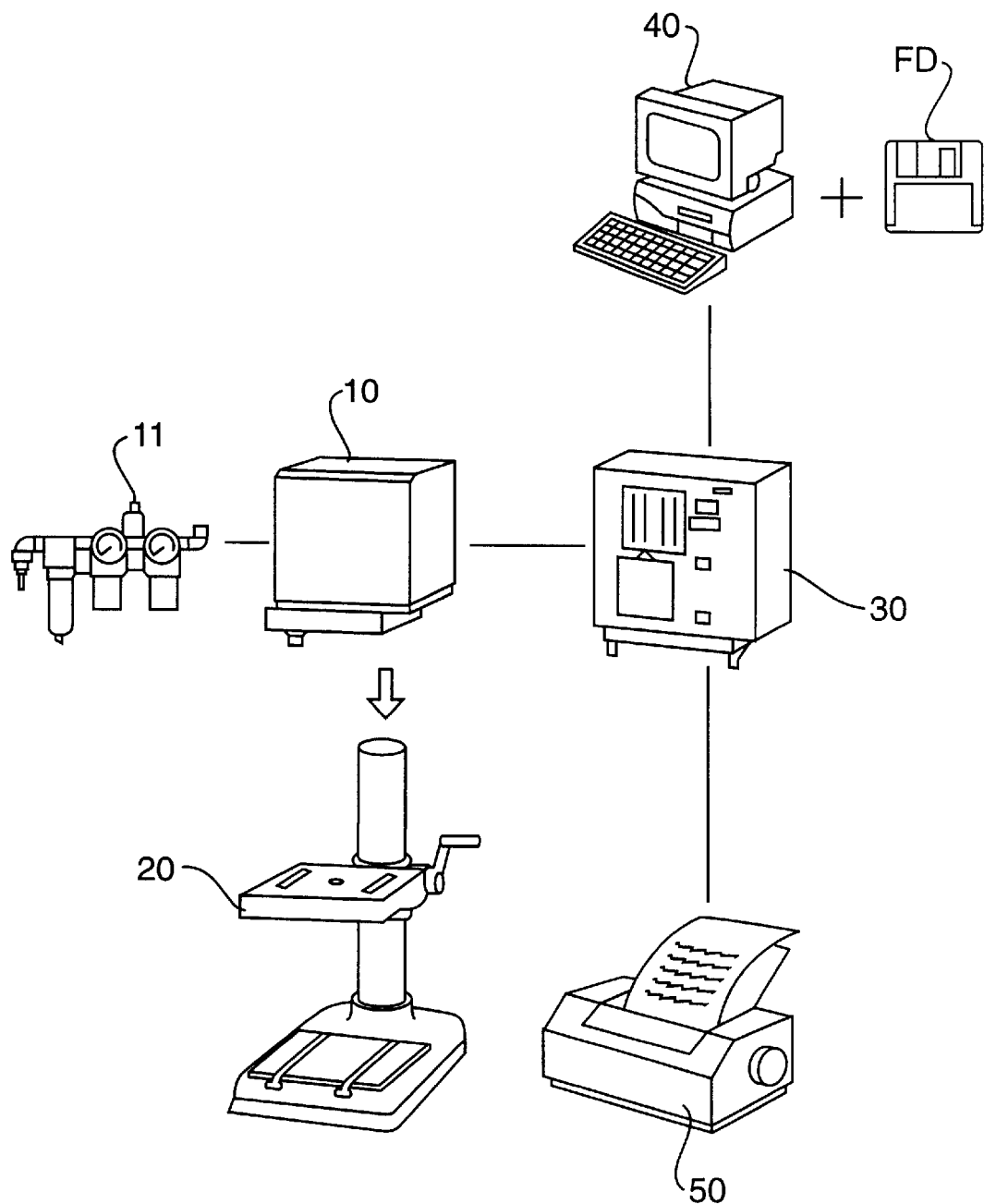
FIG. 5 is a structural diagram illustrating a conventional marking apparatus.
Figure 6:
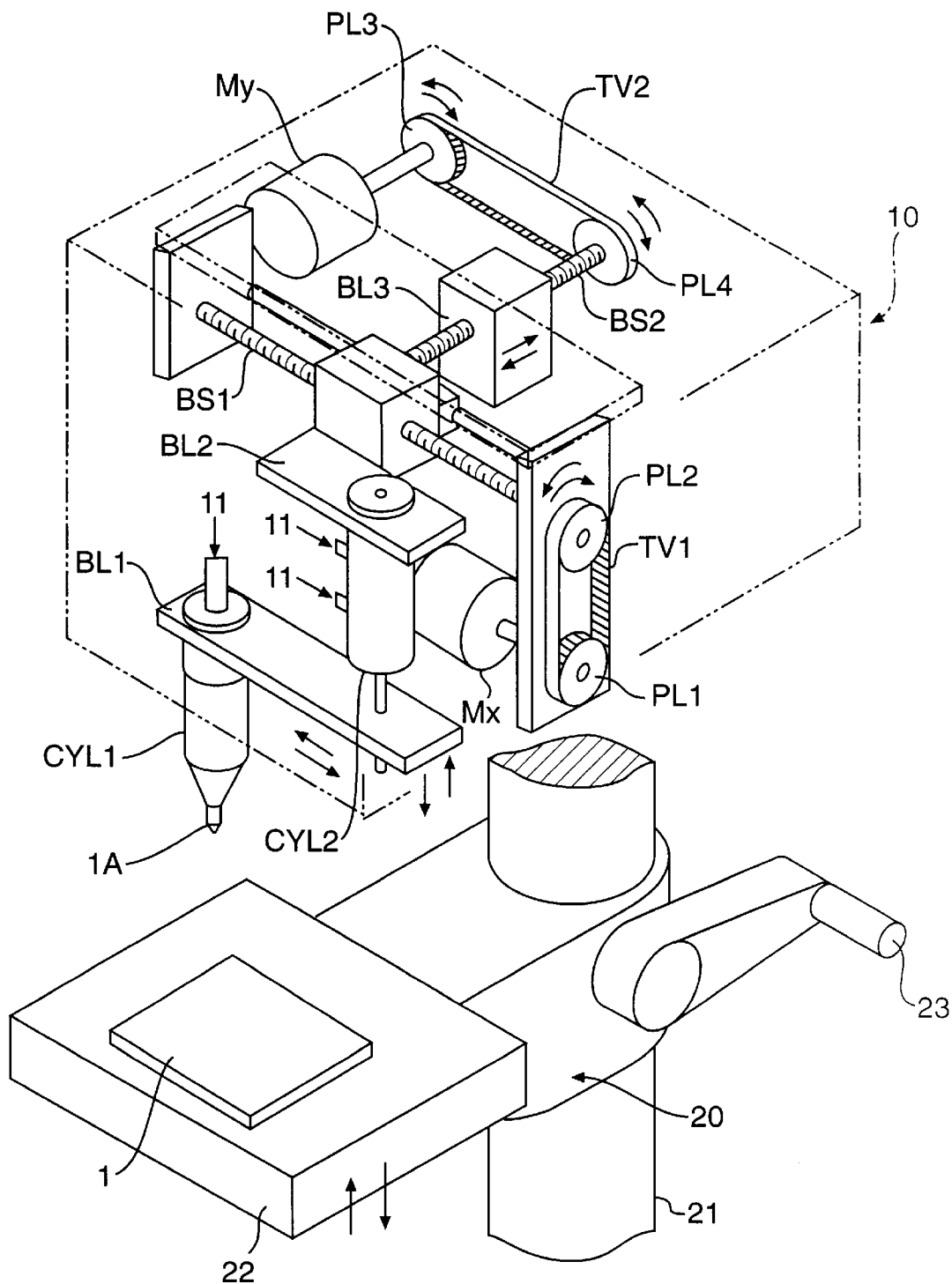
FIG. 6 is a structural diagram illustrating the mechanical section 10 in FIG. 5.

At step 106, an image of the workpiece 1 is read, and a raster/vector conversion is performed within the CAD device 40. At step 107, the image of the workpiece 1 is displayed onscreen as a marking diagram of the vector data. FIG. 3B shows the screen displayed at step 107.

At step 108, the marking diagram shown in FIG. 3B is inspected and it is determined whether or not to adjust the position of the workpiece 1. If the workpiece 1 is adjusted, then the procedure returns to step 101. If the workpiece is not adjusted, then the procedure advances to step 109.

In order to explain step 109 and the subsequent steps, the case wherein characters are written on the marking diagram defined at step 108 will be taken as an example. That is, the present apparatus is able to write characters, symbols or drawings as with conventional apparatus, but the cases besides writing of characters will be omitted in order to simplify the explanation.

At step 109, a text file 4F is selected from the first menu. At step 110, a character sequence is selected from the second menu. At step 111, a character sequence dialog is displayed on the screen of the display device 4N. While it is assumed in step 110 that the scaling ratio of the characters has been selected from the PD menu, it has been omitted from the flow chart of FIG. 2.

FIG. 4A shows the character sequence dialog which is displayed onscreen at step 111. At step 112, the position, size, font and orientation of the characters is defined by the character sequence dialog. At step 113, the defined factors are confirmed in order to determine whether to perform a run.

At step 113, the procedure returns to step 110 if the definitions are cancelled, and advances to step 114 if the definitions are to be run. At step 114, a word 1W ("MARK") is synthesized onto the marking diagram 1DF as shown in FIG. 4A, and displayed onscreen.

Step 115 and the subsequent steps are for outputting the characters shown in FIG. 4A to the marking apparatus. At step 115, a work program is saved onto an FD, then the procedure advances to further steps.

At step 115, a work file 4G is selected from the first menu. At step 110, a work instruction function is selected from the second menu. When a work instruction is selected and run, a work program is sent to the mechanical section 10 and the work is done at the mechanical section 10. The control section 30 lying therebetween is in the automatic mode.

I claim:

1. A marking apparatus with a computer-aided design device for processing markings onto a workpiece, comprising:

imaging means for taking an image of a workpiece to be marked with markings to be engraved thereon;

image display means for displaying said image of said workpiece, on a display device, taken by said imaging means along with said markings to be engraved onto said workpiece, for determining a necessity of adjusting a position of said workpiece;

program construction means for constructing a work program based on the displayed workpiece and markings;

engraving means for engraving markings onto said workpiece; and control means for moving said engraving means in X and Y directions based on said work program.

2. A marking apparatus with a computer-aided design device for processing markings onto a workpiece, comprising:

imaging means for taking an image of a workpiece to be marked with markings to be engraved thereon;

an image entering section for converting said image taken by said imaging means into a bit-map file and outputting the converted file;

image display means for displaying said bit-map file, on a display device, along with markings to be engraved onto said workpiece, for determining a necessity of adjusting a position of said workpiece;

program construction means for constructing a first work program based on the displayed bit-map file and markings;

engraving means for engraving said markings onto said workpiece by pressing and moving a rapidly vibrating stylus over said workpiece; and control means for constructing a second work program based on said first work program, then moving said engraving means in X and Y directions based on said second work program.

3. A marking apparatus with a computer-aided design device according to claim 2, wherein said program construction means is capable of enlarging and contracting said marking symbol and drawing displayed on said display means based on inputted display scaling ratios.

* * * * *

UNITED STATES PATENT AND TRADEMARK OFFICE
CERTIFICATE OF CORRECTION

PATENT NO.   : 5,818,721
DATED        : October 06, 1998
INVENTOR(S)  : Kazuyuki FUNAHASHI It is certified that error appears in the above-identified patent and that said Letters Patent is hereby corrected as shown below:

Title Page, Item [54], in the Title, line 2, "CAN" should read --CAD--.

Column 1, line 2, Title of Invention, "CAN" should read --CAD--.

Signed and Sealed this

Nineteenth Day of October, 1999

Attest:

Q. TODD DICKINSON

*Attesting Officer*     *Acting Commissioner of Patents and Trademarks*